Sept. 28, 1926.

H. C. MAISE 1,601,130

INTERIOR FINISH STRIP FOR VEHICLE BODIES

Filed May 11, 1925

INVENTOR.
HERMAN C. MAISE
BY
ATTORNEY.

Patented Sept. 28, 1926.

1,601,130

UNITED STATES PATENT OFFICE.

HERMAN C. MAISE, OF DETROIT, MICHIGAN, ASSIGNOR TO BRIGGS MANUFACTURING COMPANY, OF DETROIT, MICHIGAN, A CORPORATION OF MICHIGAN.

INTERIOR-FINISH STRIP FOR VEHICLE BODIES.

Application filed May 11, 1925. Serial No. 29,557.

This invention relates generally to finish strips for the interior of vehicle bodies.

One of the essential objects of the invention is to provide a finish strip of this type that has a portion for holding suitable trimming material and that has another portion which cooperates with a wall of an L-shaped rabbet in the body pillar to form a window guide.

Another object is to provide a neat finish strip that is simple in construction and can be manufactured at a comparatively low cost.

With the above and other objects in view, the invention consists of certain novel features of construction, combination and arrangement of parts as will be more fully described and particularly pointed out in the appended claims.

Figure 1:
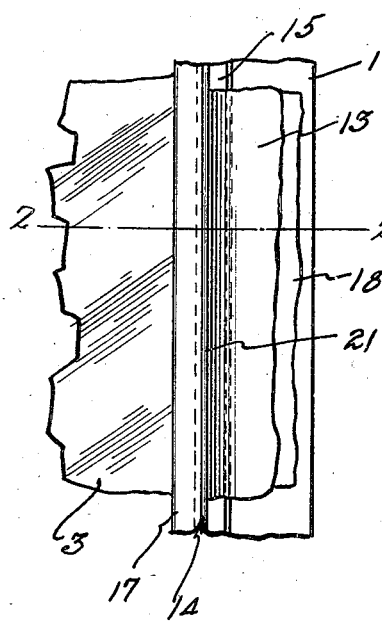
Figure 1 is a fragmentary side elevation of a construction embodying my invention.
Figure 2:
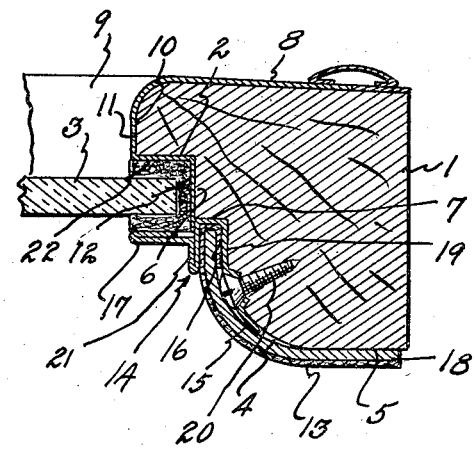
Figure 2 is a sectional view taken on the line 2—2 of Figure 1.
Figure 3:
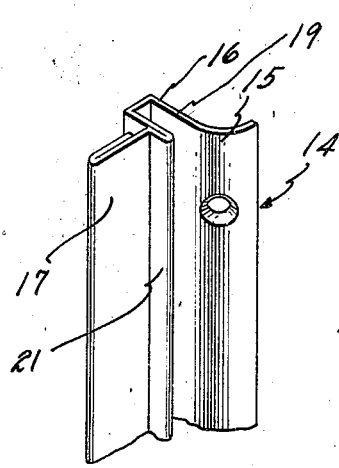
Figure 3 is a perspective view of the finish strip.

Referring to the drawing, the numeral 1 designates a pillar preferably of a vehicle body of the closed type, having an L-shaped rabbet 2 in its front face for receiving the side edge of a vertically movable window panel 3. As shown, this pillar 1 is preferably formed of wood and is provided at the inner edge of the rabbet with a longitudinally extending rounded face 4 which preferably connects into the inner face 5 of the pillar and is offset rearwardly with respect to the rear wall 6 of the rabbet 2 to form a shoulder 7.

To provide a neat appearance, the outer metal panel 8, forming the exterior finish of the vehicle body, is preferably provided at the side edge of the window opening 9 with an inwardly extending flange 10 that rests against the forward face 11 of the pillar and terminates at its inner edge in an L-shaped rabbet 12 that is preferably offset rearwardly with respect to the flange 10 and is secured in the rabbet 2 of the pillar.

For concealing the joint between the usual trimming material 13, forming the interior finish of the body, and the pillar 1, I provide a suitable finish strip 14 that is preferably formed of a single sheet of light gauge metal. As shown, this finish strip 14 is provided with a transversely curved attaching portion 15, an intermediate channel-shaped portion 16, and a lateral portion 17. In use, the channel-shaped portion 16 seats against the shoulder 7 of the pillar and receives the forward free edges of the trimming material 13 and backing 18 therefor; the attaching portion 15 projects rearwardly from the rear wall 19 of the channel-shaped portion 16 and is secured to the rounded portion 4 of the pillar, preferably by the screws 20; and the lateral portions 17 projects forwardly from the front wall 21 of the channel portion 16, preferably intermediate the inner and outer edges thereof, and cooperates with the outer wall 22 of the rabbet 12 to form a guide or runway for the window panel 3.

Thus, from the foregoing description, it will be readily apparent that a single strip 14 will suffice to hold the trimming material 13 and to cooperate with the rabbet 12 to form a window guide. Moreover the trimming material 13 with its backing may be easily and quickly slipped into the channel-shaped portion 16 of the strip 14 after the latter has been attached to the pillar, thereby facilitating assembly. When applied to the strip 14, the trimming material 13 overlaps the attaching portion 15 and conceals the screws 20, hence a neat joint is obtained.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is my invention is:

1. The combination with a pillar, and trimming material therefor, of a metal panel secured to said pillar, and a finish strip secured to said pillar having a portion cooperating with a portion of the panel to form a channel for a glass panel, and having another portion for receiving an edge of the trimming material.

2. The combination with a pillar having an L-shaped rabbet, and trimming material extending over a portion of the pillar, of a finish strip secured to the pillar having a channel-shaped portion for receiving a portion of the trimming material and having another portion cooperating with a wall of the rabbet to form a window guide.

3. The combination with a pillar having a shoulder, of a finish strip having a channel-shaped body secured against said shoulder for receiving a lining for the pillar and having a lateral portion forming a continuation of one wall of the channel constituting an attaching portion for the strip and a bearing for the lining.

4. The combination with a pillar having a substantially L-shaped rabbet, of a channel-shaped strip having a lateral portion secured to the pillar and having another lateral portion cooperating with a wall of the rabbet to form a channel for a glass panel, and a lining concealing the first lateral portion and received in the channel of said strip.

5. A finish strip for vehicle bodies comprising a channel-shaped body designed to receive an edge of trimming material and the like, one side wall of said channel body having an outwardly projecting lateral flange, said flange constituting a continuation of said side wall and being provided with an aperture for receiving a securing element and the like, the opposite side wall of said channel body having a return-bent portion terminating in an outwardly projecting lateral flange.

In testimony whereof I affix my signature.

HERMAN C. MAISE.